United States Patent
Buss et al.

(10) Patent No.: US 10,275,723 B2
(45) Date of Patent: Apr. 30, 2019

(54) POLICY ENFORCEMENT VIA ATTESTATIONS

(75) Inventors: Duane Fredrick Buss, West Mountain, UT (US); Stephen R. Carter, Spanish Fork, UT (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1006 days.

(21) Appl. No.: 11/638,121

(22) Filed: Dec. 13, 2006

(65) Prior Publication Data

US 2007/0179802 A1 Aug. 2, 2007

Related U.S. Application Data

(63) Continuation-in-part of application No. 11/225,993, filed on Sep. 14, 2005, now Pat. No. 10,063,523, and a continuation-in-part of application No. 11/225,994, filed on Sep. 14, 2005, now Pat. No. 8,281,374.

(51) Int. Cl.
  *G06Q 10/00* (2012.01)
  *G06Q 10/06* (2012.01)
  *H04L 29/06* (2006.01)

(52) U.S. Cl.
  CPC .............. *G06Q 10/00* (2013.01); *G06Q 10/06* (2013.01); *H04L 63/102* (2013.01)

(58) Field of Classification Search
  CPC ..................................................... G06Q 10/00
  USPC .......................................... 705/1–45, 50–79
  See application file for complete search history.

(56) References Cited

U.S. PATENT DOCUMENTS

| | | |
|---|---|---|
| 4,123,747 A | 10/1978 | Lancto et al. |
| 5,005,200 A | 4/1991 | Fischer |
| 5,361,359 A | 11/1994 | Tajalli et al. |
| 5,388,213 A | 2/1995 | Oppenheimer et al. |
| 5,544,322 A | 8/1996 | Cheng et al. |
| 5,579,478 A | 11/1996 | Heiserman et al. |
| 5,638,446 A | 6/1997 | Rubin |
| 5,692,047 A | 11/1997 | Mcmanis |
| 5,813,009 A | 9/1998 | Johnson et al. |

(Continued)

FOREIGN PATENT DOCUMENTS

| | | |
|---|---|---|
| EP | 1773020 A1 | 9/2006 |
| EP | 1764978 | 3/2007 |

(Continued)

OTHER PUBLICATIONS

"European Application No. 07122559 Search Report", (dated Apr. 10, 2008), 2 pgs.

(Continued)

*Primary Examiner* — Abhishek Vyas
*Assistant Examiner* — Murali K Dega
(74) *Attorney, Agent, or Firm* — Kilpatrick Townsend & Stockton LLP (57) ABSTRACT

Policy enforcement via attestations is provided. A principal operates within an environment and assumes roles having certain access rights to resources and the principal takes actions while assuming those roles. The roles and actions are monitored and attestations are raised under the proper set of circumstances. The attestations trigger policy restrictions that are enforced against the principal. The policy restrictions circumscribe the access rights to the resources.

20 Claims, 3 Drawing Sheets

(56) References Cited

U.S. PATENT DOCUMENTS

| | | | |
|---|---|---|---|
| 5,892,904 A | 4/1999 | Atkinson et al. | |
| 5,918,210 A | 6/1999 | Rosenthal et al. | |
| 5,924,077 A | 7/1999 | Beach et al. | |
| 5,987,134 A | 11/1999 | Shin et al. | |
| 6,023,704 A | 2/2000 | Gerard et al. | |
| 6,025,757 A | 2/2000 | Tsukagoshi et al. | |
| 6,029,144 A | 2/2000 | Barrett et al. | |
| 6,041,411 A | 3/2000 | Wyatt | |
| 6,055,637 A | 4/2000 | Hudson et al. | |
| 6,067,525 A | 5/2000 | Johnson et al. | |
| 6,073,234 A | 6/2000 | Kigo et al. | |
| 6,092,194 A | 7/2000 | Touboul | |
| 6,107,931 A | 8/2000 | Nicholson | |
| 6,149,522 A | 11/2000 | Alcorn et al. | |
| 6,167,513 A | 12/2000 | Inoue et al. | |
| 6,170,057 B1 | 1/2001 | Inoue et al. | |
| 6,230,271 B1 | 5/2001 | Wadlow et al. | |
| 6,308,163 B1 | 10/2001 | Du et al. | |
| 6,463,468 B1 | 10/2002 | Buch et al. | |
| 6,471,521 B1 | 10/2002 | Dornbush et al. | |
| 6,516,416 B2 | 2/2003 | Gregg et al. | |
| 6,532,451 B1 | 3/2003 | Schell et al. | |
| 6,561,425 B2 | 5/2003 | Kresina et al. | |
| 6,600,168 B1 | 7/2003 | Geng | |
| 6,615,352 B2 | 9/2003 | Terao et al. | |
| 6,671,350 B1 | 12/2003 | Oxley | |
| 6,704,728 B1 | 3/2004 | Chang et al. | |
| 6,715,073 B1 | 3/2004 | An et al. | |
| 6,718,470 B1* | 4/2004 | Adams | 726/10 |
| 6,725,269 B1 | 4/2004 | Megiddo | |
| 6,735,701 B1 | 5/2004 | Jacobson | |
| 6,750,883 B1 | 6/2004 | Parupudi et al. | |
| 6,754,642 B2 | 6/2004 | Nahidipour et al. | |
| 6,769,060 B1 | 7/2004 | Dent et al. | |
| 6,795,967 B1 | 9/2004 | Evans et al. | |
| 6,807,636 B2 | 10/2004 | Hartman et al. | |
| 6,820,135 B1 | 11/2004 | Dingman et al. | |
| 6,836,843 B2 | 12/2004 | Seroussi et al. | |
| 6,871,279 B2 | 3/2005 | Sames et al. | |
| 6,931,440 B1 | 8/2005 | Blumenau et al. | |
| 6,937,976 B2 | 8/2005 | Apte | |
| 6,944,183 B1 | 9/2005 | Iyer et al. | |
| 6,957,332 B1 | 10/2005 | Ellison et al. | |
| 7,098,753 B1 | 8/2006 | Dumitrescu et al. | |
| 7,120,802 B2 | 10/2006 | Shear et al. | |
| 7,123,113 B1 | 10/2006 | Brennan et al. | |
| 7,219,142 B1 | 5/2007 | Parekh et al. | |
| 7,290,288 B2 | 10/2007 | Gregg et al. | |
| 7,292,114 B2 | 11/2007 | Greenberg | |
| 7,332,979 B2 | 2/2008 | Connell et al. | |
| 7,350,237 B2* | 3/2008 | Vogel et al. | 726/27 |
| 7,734,754 B2 | 6/2010 | Dougherty et al. | |
| 7,788,366 B2* | 8/2010 | Yacoby et al. | 709/224 |
| 7,788,711 B1 | 8/2010 | Sun et al. | |
| 8,281,374 B2 | 10/2012 | Carter | |
| 8,316,237 B1 | 11/2012 | Felsher et al. | |
| 8,468,330 B1 | 6/2013 | Reed et al. | |
| 9,781,154 B1 | 10/2017 | Carter et al. | |
| 2001/0051906 A1 | 12/2001 | Esposito | |
| 2001/0052012 A1 | 12/2001 | Rinne et al. | |
| 2002/0029340 A1* | 3/2002 | Pensak et al. | 713/182 |
| 2002/0107875 A1 | 8/2002 | Seliger et al. | |
| 2002/0120917 A1 | 8/2002 | Abrari et al. | |
| 2002/0138735 A1* | 9/2002 | Felt et al. | 713/176 |
| 2002/0147801 A1 | 10/2002 | Gullotta et al. | |
| 2002/0156785 A1 | 10/2002 | Kumar et al. | |
| 2002/0160347 A1 | 10/2002 | Wallace et al. | |
| 2002/0169876 A1 | 11/2002 | Curie et al. | |
| 2002/0186844 A1 | 12/2002 | Levy et al. | |
| 2003/0070091 A1* | 4/2003 | Loveland | H04L 63/104 726/12 |
| 2003/0074579 A1 | 4/2003 | Della-Libera et al. | |
| 2003/0088786 A1* | 5/2003 | Moran et al. | 713/201 |
| 2003/0115179 A1 | 6/2003 | Prabakaran et al. | |
| 2003/0115246 A1 | 6/2003 | Mahon et al. | |
| 2003/0126464 A1 | 7/2003 | McDaniel et al. | |
| 2003/0130931 A1 | 7/2003 | Mirlas et al. | |
| 2003/0131232 A1* | 7/2003 | Fraser | G06F 21/6218 713/156 |
| 2003/0140230 A1 | 7/2003 | De Jong et al. | |
| 2003/0149599 A1 | 8/2003 | Goodall et al. | |
| 2003/0153991 A1 | 8/2003 | Visser et al. | |
| 2004/0044643 A1 | 3/2004 | DeVries et al. | |
| 2004/0044730 A1 | 3/2004 | Gockel et al. | |
| 2004/0064568 A1* | 4/2004 | Arora et al. | 709/228 |
| 2004/0093502 A1 | 5/2004 | Shurygailo et al. | |
| 2004/0107118 A1 | 6/2004 | Harnsberger et al. | |
| 2004/0128392 A1 | 7/2004 | Blakley et al. | |
| 2004/0128506 A1* | 7/2004 | Blakley et al. | 713/170 |
| 2004/0139319 A1 | 7/2004 | Favazza et al. | |
| 2004/0148326 A1 | 7/2004 | Nadgir et al. | |
| 2004/0151323 A1 | 8/2004 | Olkin et al. | |
| 2004/0162833 A1 | 8/2004 | Jones et al. | |
| 2004/0177326 A1 | 9/2004 | Bibko et al. | |
| 2004/0210771 A1* | 10/2004 | Wood et al. | 713/201 |
| 2004/0221049 A1* | 11/2004 | Blumenau | H04L 29/06 709/229 |
| 2004/0236702 A1 | 11/2004 | Fink et al. | |
| 2004/0240846 A1 | 12/2004 | Cookson et al. | |
| 2005/0027845 A1 | 2/2005 | Secor et al. | |
| 2005/0044411 A1 | 2/2005 | Somin et al. | |
| 2005/0060584 A1* | 3/2005 | Ginter et al. | 713/201 |
| 2005/0068983 A1 | 3/2005 | Cater et al. | |
| 2005/0120201 A1* | 6/2005 | Benaloh et al. | 713/155 |
| 2005/0144144 A1* | 6/2005 | Graff | G06F 21/33 705/76 |
| 2005/0204129 A1* | 9/2005 | Sudia et al. | 713/158 |
| 2005/0216956 A1 | 9/2005 | Orr et al. | |
| 2005/0228688 A1 | 10/2005 | Visser et al. | |
| 2005/0254652 A1* | 11/2005 | Engler et al. | 380/270 |
| 2005/0257045 A1* | 11/2005 | Bushman et al. | 713/156 |
| 2006/0005254 A1 | 1/2006 | Ross | |
| 2006/0071729 A1 | 4/2006 | Cetin et al. | |
| 2006/0095953 A1 | 5/2006 | Frank | |
| 2006/0100010 A1 | 5/2006 | Gatto et al. | |
| 2006/0200680 A1* | 9/2006 | Ellison et al. | 713/190 |
| 2007/0061263 A1 | 3/2007 | Carter et al. | |
| 2007/0061872 A1 | 3/2007 | Carter | |
| 2007/0112574 A1* | 5/2007 | Greene | 705/1 |
| 2007/0143824 A1* | 6/2007 | Shahbazi | H04L 63/083 726/1 |
| 2007/0180490 A1* | 8/2007 | Renzi et al. | 726/1 |
| 2007/0244833 A1* | 10/2007 | Camenisch | 705/71 |
| 2008/0180693 A1 | 7/2008 | Dillon et al. | |
| 2011/0052012 A1 | 3/2011 | Bambha et al. | |
| 2017/0374096 A1 | 12/2017 | Carter et al. | |

FOREIGN PATENT DOCUMENTS

| | | |
|---|---|---|
| EP | 1933264 | 6/2008 |
| EP | 1764978 | 11/2010 |
| EP | 1773020 B1 | 11/2017 |

OTHER PUBLICATIONS

Abbie Barbir Nortel Networks, "Overview and Summary of SAML v. 2", (Oct. 5, 2004), 7 pgs.

Bajaj, Siddharth, et al., "Web Services Federation Language (WS Federation)", Version 1.0, (Jul. 8, 2003), 1-34.

Hallam-Baker, Phillip, "Security Assertions Markup Language", *Security Assertions Markup Language, Core Assertion Architecture—Examples and Explanations*, Draft Version 0.7, (May 14, 2001), 24 Pages.

Hughes, J, et al., "Security Assertion Markup Language: Technical Overview", (Sep. 12, 2005), 40 pgs.

Poniszewska-Maranda, A, "Role engineering of information system using extended RBAC model", *Enabling Technologies: Infrastructure for collaborative enterprise, 14th IEEE Workshops on Linkoping*, Sweden Jun. 13-15, 2005, (Jun. 13, 2005), 154-159.

Siemens, Gunther C, "Saml in Authorization Policies", (Feb. 13, 2005), 7 pgs.

(56) References Cited

OTHER PUBLICATIONS

Extended European Search Report for EP 06 120 148, dated Dec. 27, 2006, 12 pages.
Extended European Search Report for EP 06 120 149, dated Jan. 25, 2007, 6 pages.
U.S. Appl. No. 11/225,993, filed Sep. 14, 2005, Office Action dated Aug. 25, 2008, 24 pages.
U.S. Appl. No. 11/225,993, filed Sep. 14, 2005, Final Office Action dated Jan. 26, 2009, 37 pages.
U.S. Appl. No. 11/225,993, filed Sep. 14, 2005, Advisory Action dated Apr. 24, 2009, 3 pages.
U.S. Appl. No. 11/225,993, filed Sep. 14, 200, Requirement for Restriction/Election dated Aug. 7, 2009, 7 pages.
U.S. Appl. No. 11/225,993, filed Sep. 14, 2005, Office Action dated Oct. 29, 2009, 21 pages.
U.S. Appl. No. 11/225,993, filed Sep. 14, 2005, Final Office Action dated May 13, 2010, 18 pages.
U.S. Appl. No. 11/225,993, filed Sep. 14, 2005, Advisory Action dated Sep. 29, 2010, 4 pages.
U.S. Appl. No. 11/225,994, filed Sep. 14, 2005, Office Action dated Feb. 24, 2009, 10 pages.
U.S. Appl. No. 11/225,994, filed Sep. 14, 2005, Final Office Action dated Jul. 30, 2009, 10 pages.
U.S. Appl. No. 11/225,994, filed Sep. 14, 2005, Advisory Action dated Oct. 27, 2009, 3 pages.
U.S. Appl. No. 11/225,994, filed Sep. 14, 2005, Office Action dated Jan. 25, 2010, 11 pages.
U.S. Appl. No. 11/225,994, filed Sep. 14, 2005, Final Office Action dated Jul. 22, 2010, 10 pages.
U.S. Appl. No. 11/225,994, filed Sep. 14, 2005, Advisory Action dated Oct. 15, 2010, 3 pages.
U.S. Appl. No. 11/225,994, filed Sep. 14, 2005, Office Action dated Sep. 19, 2011, 10 pages.
U.S. Appl. No. 11/225,994, filed Sep. 14, 2005, Notice of Allowance dated Mar. 21, 2012, 11 pages.
U.S. Appl. No. 11/225,993, Non-Final Office Action dated Sep. 13, 2013, 26 pages.
U.S. Appl. No. 11/225,993, Final Office Action dated Jul. 28, 2014, 25 pages.
U.S. Appl. No. 11/225,994, Notice of Allowance dated Aug. 24, 2012, 5 pages.
European Application No. 06120148, European Search Report dated May 21, 2007, 12 pages.
European Application No. 06120149, European Search Report dated Mar. 12, 2007, 6 pages.
U.S. Appl. No. 11/225,993 "Non-Final Office Action", dated Jul. 12, 2016, 26 pages.
U.S. Appl. No. 10/404,495, filed Apr. 1, 2003, "Advisory Action", dated Feb. 6, 2009, 2 pages.
U.S. Appl. No. 10/404,495, filed Apr. 1, 2003, "Advisory Action", dated Mar. 10, 2010, 2 pages.
U.S. Appl. No. 10/404,495, filed Apr. 1, 2003, "Final Office Action", dated Nov. 25, 2008, 11 pages.
U.S. Appl. No. 10/404,495, filed Apr. 1, 2003, "Final Office Action", dated Jan. 15, 2014, 14 pages.
U.S. Appl. No. 10/404,495, filed Apr. 1, 2003, "Final Office Action", dated Dec. 28, 2009, 18 pages.
U.S. Appl. No. 10/404,495, filed Apr. 1, 2003, "Final Office Action", dated May 6, 2016, 35 pages.
U.S. Appl. No. 10/404,495, filed Apr. 1, 2003, "Non Final Office Action", dated May 28, 2009, 16 pages.
U.S. Appl. No. 10/404,495, filed Apr. 1, 2003, "Non Final Office Action", dated Jun. 20, 2013, 17 pages
U.S. Appl. No. 10/404,495, filed Apr. 1, 2003, "Non Final Office Action", dated May 9, 2008, 9 pages.
U.S. Appl. No. 10/404,495, filed Apr. 1, 2003, "Non-Final Office Action", dated Oct. 22, 2015, all pages.
U.S. Appl. No. 10/404,495, filed Apr. 1, 2003, "Restriction Requirement", dated Jan. 23, 2008, 6 pages.
U.S. Appl. No. 11/225,993, filed Sep. 14, 2005, "Advisory Action", dated May 30, 2017, 4 pages.
U.S. Appl. No. 11/225,993, filed Sep. 14, 2005, "Final Office Action", dated Feb. 13, 2017, 22 pages.
U.S. Appl. No. 15/275,931, filed Sep. 26, 2016, "First Action Interview Pilot Program Pre-Interview Communication", dated Feb. 14, 2017, 9 pages.
U.S. Appl. No. 15/275,931, filed Sep. 26, 2016, "Notice of Allowance", dated Jun. 1, 2017, 8 pages.
Office Action in European Patent Application No. 06120149.7, dated Oct. 18, 2007, 3 pages.
Office Action in European Patent Application No. 06120149.7, dated Jun. 6, 2007, 4 pages.
Office Action in European Patent Application No. 06120149.7, dated Oct. 2, 2008, 4 pages.
U.S. Appl. No. 11/225,993, filed Sep. 14, 2005 received a Non-Final Office Action dated Nov. 8, 2017, 19 pages.
European Application No. 06120148.9 filed Sep. 5, 2006 received an Extended European Search Report dated Dec. 27, 2016, 11 pages.
U.S. Appl. No. 11/225,993, filed Sep. 14, 2005, received a Notice of Allowance, dated May 11, 2018, 9 pages.
U.S. Appl. No. 10/612,666, filed Jun. 30, 2003, Non-final Office Action dated Oct. 31, 2006, 21 pages.
U.S. Appl. No. 10/612,666, filed Jun. 30, 2003, Non-final Office Action dated Dec. 31, 2007, 27 pages.
U.S. Appl. No. 10/612,666, filed Jun. 30, 2003, Non-final Office Action dated May 21, 2009, 15 pages.
U.S. Appl. No. 10/612,666, filed Jun. 30, 2003, Non-final Office Action dated Apr. 5, 2010, 16 pages.
U.S. Appl. No. 10/612,666, filed Jun. 30, 2003, Non-final Office Action dated Jan. 7, 2011, 19 pages.
U.S. Appl. No. 10/612,666, filed Jun. 30, 2003, Non-final Office Action dated Mar. 1, 2012, 21 pages.
U.S. Appl. No. 10/612,666, filed Jun. 30, 2003, Final Office Action dated Jun. 15, 2007, 28 pages.
U.S. Appl. No. 10/612,666, filed Jun. 30, 2003, Final Office Action dated Jul. 9, 2008, 18 pages.
U.S. Appl. No. 10/612,666, filed Jun. 30, 2003, Final Office Action dated Dec. 4, 2009, 16 pages.
U.S. Appl. No. 10/612,666, filed Jun. 30, 2003, Final Office Action dated Sep. 13, 2010, 18 pages.
U.S. Appl. No. 10/612,666, filed Jun. 30, 2003, Final Office Action dated Jun. 23, 2011, 22 pages.
U.S. Appl. No. 10/612,666, filed Jun. 30, 2003, Final Office Action dated Oct. 30, 2012, 21 pages.
U.S. Appl. No. 10/612,666, filed Jun. 30, 2003,, Advisory Action dated Aug. 31, 2007, 3 pages.
U.S. Appl. No. 10/612,666, filed Jun. 30, 2003, Advisory Action dated Feb. 19, 2010, 3 pages.
U.S. Appl. No. 10/612,666, filed Jun. 30, 2003, Advisory Action dated Dec. 1, 2010, 3 pages.
U.S. Appl. No. 10/612,666, filed Jun. 30, 2003, Advisory Action dated Sep. 15, 2011, 3 pages.
U.S. Appl. No. 10/612,666, filed Jun. 30, 2003, Pre-Appeal Brief Review Panel Decision—Rejected dated Jan. 13, 2009, 2 pages.
U.S. Appl. No. 10/612,666, filed Jun. 30, 2003, Notice of Allowance dated Feb. 19, 2013, 32 pages.

* cited by examiner

FIG. 4 ional application Ser. No. 11/225,993, filed on Sep. 14, 2005 and now U.S. Pat. No. 10,063,523 and entitled "Crafted Identities;" and U.S. application Ser. No. 11/225,994, also filed on Sep. 14, 2005 now U.S. Pat. No. 8,281,374 and entitled "Attested Identities;" the disclosures of which are incorporated by reference herein in their entireties.

POLICY ENFORCEMENT VIA ATTESTATIONS

RELATED APPLICATIONS

The present application is a Continuation-In Part of U.S. application Ser. No. 11/225,993, filed on Sep. 14, 2005 and now U.S. Pat. No. 10,063,523 and entitled "Crafted Identities;" and U.S. application Ser. No. 11/225,994, also filed on Sep. 14, 2005 now U.S. Pat. No. 8,281,374 and entitled "Attested Identities;" the disclosures of which are incorporated by reference herein in their entireties.

FIELD

The invention relates generally to network security and more particularly to techniques for policy enforcement via attestations.

BACKGROUND

Security is a pervasive issue with network transactions. Increasingly, intruders are finding ways to avoid new security techniques. Moreover, in some industries security techniques may be strongly regulated by the government. For example in the online financial and banking industries, transactions may have to achieve a certain degree of regulatory compliance in order to ensure that money is not stolen during those transactions.

Additionally from a privacy perspective, increased security can also potentially expose consumers to profiling, identity theft, etc. Generally, enterprises are concerned with authenticating a user for access to their assets. But, users may also desire to know that the enterprises in which they are interacting with are legitimate and have installed proper privacy safeguards.

In most cases, once a user is authenticated for access, and the user is satisfied that he/she is interacting with a legitimate enterprise, the access rights and permissions for enterprise assets are set for an entire user session. However, this does not adequately account for changing circumstances, which may warrant a desire on the part of the enterprise to restrict access even further and even beyond what was initially established for the session.

Accordingly, improved techniques for dynamic security enforcement are needed.

SUMMARY

In various embodiments, techniques for policy enforcement via attestations are presented. More specifically, and in an embodiment, a method for policy enforcement via an attestation is provided. A principal is detected as operating within an environment. A condition is identified within the environment and an attestation is received in response to the condition. Next, a policy is enforced in response to the attestation; and the policy is enforced against the principal within the environment.

DETAILED DESCRIPTION

A "resource" includes a service, system, device, directory, data store, user, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from a one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc. As more and more identifiers are accumulated, a confidence in a particular identity grows stronger and stronger. In an embodiment, the identifier is a signature or a pair of signatures. For example, the signature of an identity service that vouches for a crafted identity, the signature of a principal associated with the crafted identity, or the signature of both the identity service and the principal.

A principal can assume or use a variety of different identities. Two example types of identities that a principal may assume are crafted identities and attested identities. Examples of crafted identities may be found in U.S. application Ser. No. 11/225,993 entitled "Crafted Identities." Examples of attested identities may be found in U.S. application Ser. No. 11/225,994 entitled "Attested Identities." The applications are commonly assigned to Novell, Inc. of Provo, Utah and the disclosures of which are incorporated by reference herein.

"Authentication" is the process of validating the association of identifiers and secrets according to a policy, which is specific to the context in which the resulting identity is to be used. Thus, when identifiers are validated within a context specific to how an identity is to be used, the identity for that context is considered to be authenticated.

In some embodiments, an identity service may be used to distribute, manage, and create identities. Examples of an identity service can be found in: U.S. patent Ser. No. 10/765,523 ("Techniques for Dynamically Establishing and Managing Authentication and Trust Relationships"), Ser. No. 10/767,884 ("Techniques for Establishing and Managing a Distributed Credential Store"), and Ser. No. 10/770,677 ("Techniques for Dynamically Establishing and Managing Trust Relationships"). These applications are commonly assigned to Novell, Inc. of Provo, Utah and the disclosures of which are incorporated by reference herein.

An "attestation" may be viewed as an assertion, statement, and/or data structure. The validity of an attestation is attested to or vouched for by an authenticated and trusted resource (e.g., principal, etc.). The attestation includes an indication as to who is providing it (e.g., attester) and under what authority the attestation is being made (e.g., identity service, particular principal, etc.). An attestation may also include a signature or the attesting resource. The attestation includes statements regarding roles, rights, access permissions, and/or policies.

In an embodiment, the attestation is provided as a Security Access Method (SAML) assertion. Although it is to be understood that many protocol or data formats may be used to represent and express attestations.

Furthermore, an attestation is presented for purposes of defining policy, defining roles, defining rights, and defining privileges with respect to one or more resources.

Various embodiments of this invention can be implemented in existing network architectures. For example, in some embodiments, the techniques presented herein are implemented in whole or in part in network architectures, operating systems (OS's), identity-based products, directory-based products, and/or proxy server-based products, distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

Figure 1:
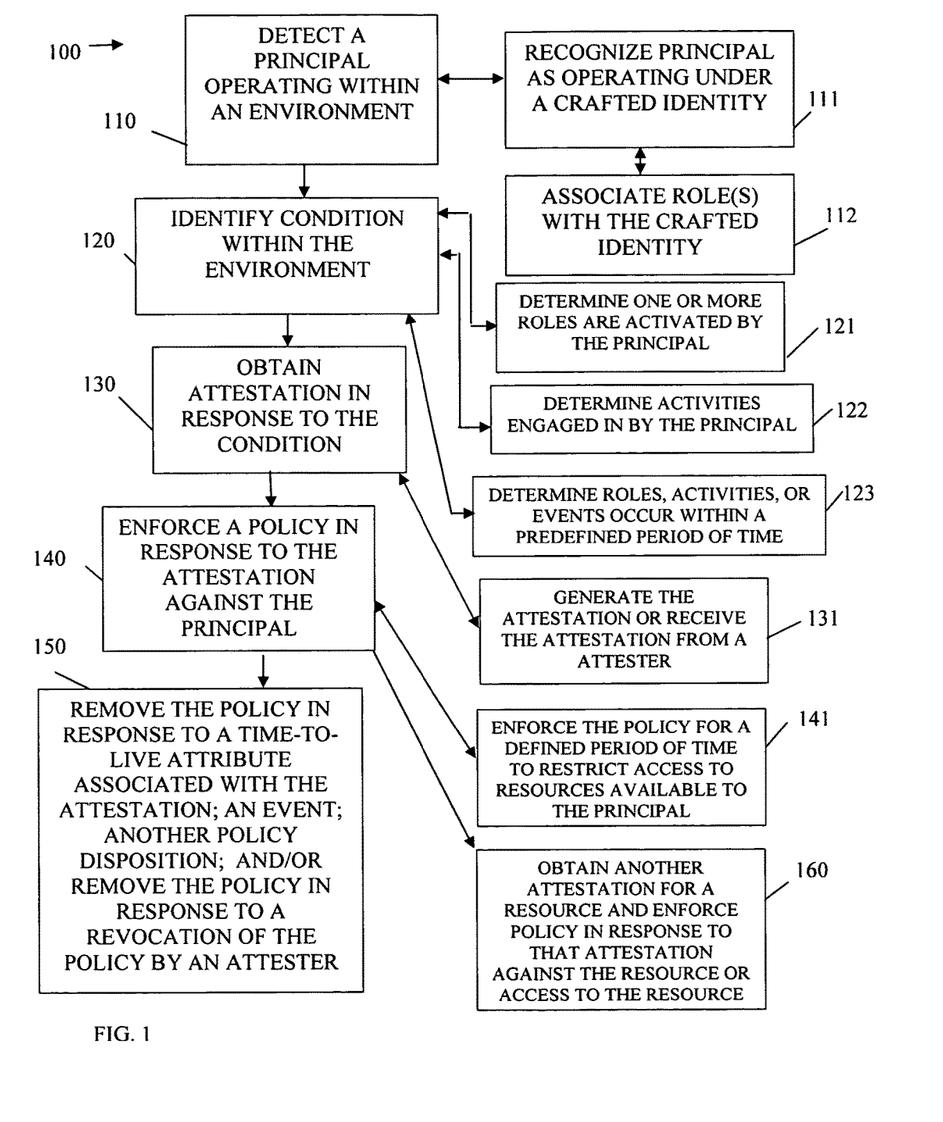
FIG. 1 is a diagram of a method for policy enforcement via an attestation, according to an example embodiment.

FIG. 1 is a diagram of a method 100 for policy enforcement via an attestation, according to an example embodiment. The method 100 (hereinafter "policy-based attestation service") is implemented in a machine-accessible and readable medium. The policy-based attestation service is also accessible over a network; the network may be wired, wireless, or a combination of wired and wireless. The policy-based attestation service is implemented as instructions that when accessed by a machine perform the processing depicted in the FIG. 1.

According to an embodiment, the policy-based attestation service may be implemented as a plug-in to an Operating System (OS). The policy-based attestation service provides enhanced security to resources accessible from the OS in the manners described more completely herein and below.

Additionally, the policy-based attestation service may interact with one or more identity services (such as the ones described above) for purposes of authenticating and resolving identities for requesting resources.

In other cases, the policy-based attestation service may be implemented as a proxy to a set of resources within a given environment or even as an enhanced set of Application Programming Interfaces associated with a set of resources, security services, and/or an identity service.

At 110, the policy-based attestation service detects a principal operating within an environment. That is, the policy-based attestation service monitors an environment where a given set of resources are accessible. Access to the resources is governed by access permissions. Access permissions are assigned based on a role designation. Some example role designations may include, but are not limited to, administrator, visitor, manager, employee, etc.

Initially, the principal is authenticated to the environment being monitored by the policy-based attestation service. In some cases, at 111, the policy-based attestation service may recognize the principal as operating under a crafted identity and/or attested identity. In general, a crafted identity is one in which a "true identity" for a given principal is concealed, such that the true identity remains anonymous to the resource that the crafted identity accesses. Also, in general, an attested identity is one in which a collection of attributes, roles, rights, privileges, and assertions are evaluated according to policy to resolve access permissions to resources.

Examples for crafted identities and attested identities may be found in the applications, which were incorporated by reference above.

In an embodiment, at 112, the principal may assume one or more role designations while operating within the environment being monitored by the policy-based attestation service. Context may dictate what role is activated or what roles are active at any given point in time. The roles drive access permissions to the resources that principal can access within the environment.

The policy-based attestation service may also have access to a policy store that includes policy limitations for a given identity, given role, given set of roles, given resource, given environment, and/or given set of resources. The policy limitations define conditions that the policy-based attestation service is to monitor within the environment. In some cases, the policy limitations may be acquired dynamically from an identity service in response to any combination of the items listed above. In still more cases, the policy limitations may be included as attributes associated with an authenticated identity associated with the principal, who is operating within the environment being monitored by the policy-based attestation service. The policy limitations may even be resolved for given roles that a particular resolved identity assumes.

At 120, the policy-based attestation service uses the policy limitations to identify a condition occurring within the environment that the principal is operating within. In a situation, at 121, this may mean that the policy-based attestation service determines one or more roles are activated by the principal. In may also be the case that at least one of the roles is active within the environment and associated with an identity other than that of the principal while another active role is associated with just the principal. In other words, the roles do not have to be just associated with the principal to affect operation of the policy-based attestation service; although this can be the case under some circumstances.

In yet another situation, at 122, the policy-based attestation service may use the policy limitations to monitor activities rather than role activations. The activities may be associated with just the principal or associated with the principal and with other principals or resources within the environment. So, operations taken by the principal or by other principals may trigger conditions defined by the policy limitations.

In still another circumstance, at 123, the policy-based attestation service may use the policy limitations to determine that a combination of role activations, activities, or even events occurring within the environment within a given predefined period of time warrant triggering conditions to process in the manners discussed below. The roles, activities, and/or events may occur exclusively within the context of the principal or may also occur within the context of other principals or resources operating within the environment with the principal.

At 130, once the policy-based attestation service identifies and detects a condition that is to be trapped or recognized according to global policy limitations, the policy-based attestation service obtains or acquires an attestation in response to the identified condition. The attestation defines another policy for dynamically altering access permissions of the principal with respect to one or more resources that the principal may access within the environment.

According to an embodiment, at 131, the policy-based attestation service may generate the attestation dynamically and request that it be enforced against the principal. This can be done by acting as an attester and interacting with an identity service that can dynamically alter access permissions for roles associated with the principal. This may also be done by the policy-based attestation service automatically (when authorized) altering access permissions for roles associated with the principal.

It may also be the case, at 131, that the policy-based attestation service receives the attestation from an attester. The attester may be another and different principal that is notified about the roles activated, activities, or events occurring within the environment. In some cases, this attester may be an identity service. In other cases, it may be any principal authorized to make attestations against an identity associated with the principal.

At 140, the policy-based attestation service enforces the policy associated with the received attestation against the principal or against predefined roles associated with the principal. In some cases, at 141, the policy may be temporary, such that it is enforced for a defined period of time for purposes of restricting access to some resources that may have otherwise been available to the principal or to activated roles associated with the principal. So, the policy that restricts access rights or permissions in some manner does not have to be permanent.

In fact, at 150, the policy-based attestation service may remove the policy and its enforcement in a variety of circumstances. For example, the policy itself may include a time-to-live attribute, which was associated with the received attestation, such that when the time-to-live attribute is satisfied the policy is no longer enforced and the access restrictions are removed. The policy can also be removed in response to a detected event or even in response to the disposition of another policy being evaluated. It may also be the case that the attester who originally supplied the attestation may request that the policy be revoked, which thereby lifts the added access restrictions.

According to another embodiment, at 160, the policy-based attestation service may be used to obtain another and different attestation in response to the condition. The new attestation is associated with a resource within the environment that the principal is trying to access or could potentially access within the environment. The policy-based attestation service then enforces another policy in response to that attestation against the resource; rather than against the principal (as was discussed above). So, the policy-based attestation service may be used to dynamically obtain and enforce attestations that generate policy against actions of a principal or against a particular resource that is accessible from the environment.

In some cases, the attestation received may also restrict the principal from creating or assuming other identities. Thus, an attestation may trigger policy that restricts the principal from temporarily creating a new crafted identity. So, the policy evaluated is not limited to restricting access to a given resource or set of resources; the policy may also restrict actions that the principal may take with an identity service to generate or assume different or even new identities.

As was briefly mentioned above, the policy-based attestation service may cooperate with an identity service or may even be integrated as an enhancement within an identity service to generate, receive, and process dynamic attestations for a principal. These attestations comport to policies that are dynamically evaluated and restrict the principal's access permissions in some manner with respect to a given resource, set of resources, or even with respect to given identities that the principal may assume or generate via an identity service.

It is also noted that the conditions that trigger receiving or generating an attestation do not have to be one dimensional. In other words, it may be a combination of conditions, such as role assignments, activities, and events, which trigger dynamic attestations and corresponding dynamic policy enforcement.

It is now appreciated how a given principal's roles, access rights, and privileges for a given session of interaction within an environment and the environment's resources may be dynamically altered in response to conditions occurring within the environment via a dynamically assigned attestation against an identity of the principal. The attestation translates to policy and the policy enforcement imposes new restrictions against the identity of the principal. This permits dynamic adjustment to security permissions or identity usage when conditions warrant such a modification.

Figure 2:
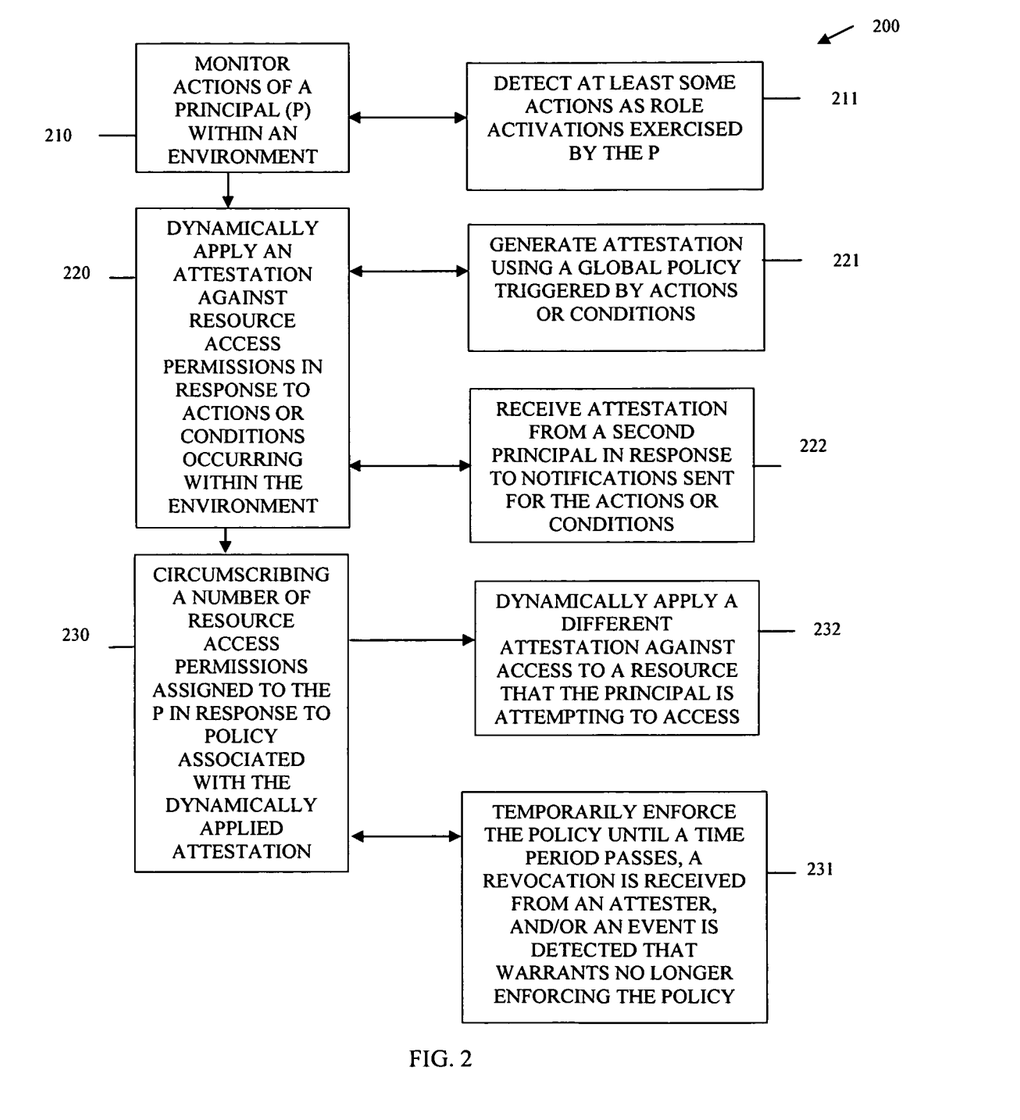
FIG. 2 is a diagram of another method for policy enforcement via an attestation, according to an example embodiment.

FIG. 2 is a diagram of another method 200 for policy enforcement via an attestation, according to an example embodiment. The method 200 (hereinafter "policy enforcement service") is implemented in a machine-accessible and readable medium as instructions, which when accessed by a machine perform the processing depicted in the FIG. 2. The policy enforcement service is also operational over a network that may be wired, wireless, or a combination of wired and wireless. The policy enforcement service of the FIG. 2 represents an alternative perspective to the policy-based attestation service represented by the method 100 of the FIG. 1 above.

At 210, the policy enforcement service monitors actions of a principal within a given environment. In some cases, at 211, the policy enforcement service may detect at least some of these actions as being role activations made by the principal under an identity being assumed by the principal within the environment, such as under a crafted identity or even an attested identity. Again the actions may also include operations that the principal takes, such as logging into a resource, accessing a certain aspect of resource (e.g., salary information of an employee database, etc.), and the like. Actions may also include events, such as updates to an employee database, where someone other than the principal caused the event to occur within the environment.

It is noted that although the policy enforcement service refers to monitoring a single environment or set of resources, this does not have to always be the case. In other words, the policy enforcement service may be implemented as an enhancement to an identity service and may be capable of receiving notifications and tracking information associated with a plurality of environments within which the principal is operating. The principal may be using a same identity or different identities within the disparate environments. Some synchronization and notification mechanism may be used to ensure proper monitoring with disparate environments.

At 220, the policy enforcement service dynamically applies an attestation against resource access permissions in response to the actions or conditions being monitored by the policy enforcement service and occurring within the environment.

In an embodiment, at 221, the policy enforcement service may generate the attestation using a global policy, which is automatically triggered by certain predefined detected actions or conditions. The generated attestation may be handled directly by the policy enforcement service or may be communicated to an identity service to handle on behalf of the policy enforcement service.

In another embodiment, at 222, the policy enforcement service may receive the attestation from a second principal in response to notifications sent for the actions or conditions detected by the policy enforcement service to the second principal. So, some principals may register to receive notifications for certain actions or conditions that occur with respect to resources or the environment. These second principals may independently determine when an attestation is to be applied and may supply that attestation to the policy enforcement service. Thus, the policy enforcement service may determine when an attestation is generated or it may be driven by other principals that determine when the attestation is to be applied.

At 230 and after the attestation is dynamically applied against resource access permissions, the policy enforcement service circumscribes a number of resource access permissions assigned to the principal in response to policy defined by the dynamically applied attestation. That is, access permissions associated with a resource may be circumscribed after policy associated with the applied attestation is enforced. In some cases, the resource may be the principal's true identity, in which case the principal's ability to create new identities may be temporarily limited. In other cases, the resource may be associated with an asset within the environment, such that the principal can no longer access that asset or has reduced functionality with respect to the asset.

In an embodiment, at 231, the policy enforcement service may just temporarily enforce the policy until a predefined period of time or date passes, until a revocation is received from an attester who originally supplied the attestation, and/or until an event is detected that warrants no loner enforcing the policy against the principal or against roles assumed by or assigned to the principal.

In still another case, at 232, the policy enforcement service may also dynamically apply a different attestation against access to a resource that the principal is or may eventually attempt to access with the environment. So, the policy enforcement service may enforce policy associated with attestations that were raised for a principal acting with the environment or for a resource accessible within the environment.

Figure 3:
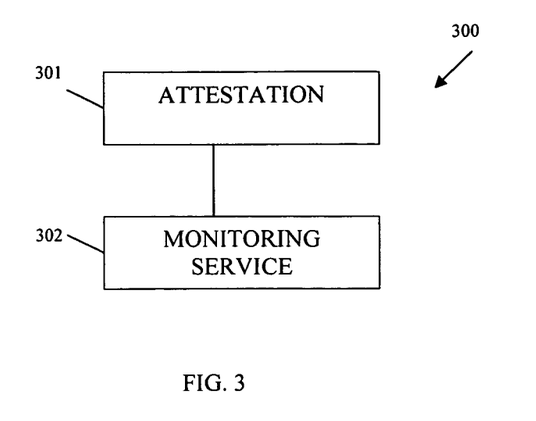
FIG. 3 is a diagram of a policy enforcement attestation system, according to an example embodiment.

FIG. 3 is a diagram of a policy enforcement attestation system 300, according to an example embodiment. The policy enforcement attestation system 300 is implemented in a machine-accessible and readable medium and is operational over a network. The network may be wired, wireless, or a combination of wired and wireless. In an embodiment, the policy enforcement attestation system 300 implements among other things the policy-based attestation service represented by the method 100 of the FIG. 1 and the policy enforcement service represented by the method 200 of the FIG. 2.

The policy enforcement attestation system 300 includes an attestation 301 and a monitoring service 302. Each of these and their interactions with one another will now be discussed in turn.

The attestation 301 represents a data structure that identities a resource or principal (type of resource) making the attestation 301; that identifies an authority under which the resource can make the attestation 301; and that identifies one or more policies to dynamically apply against a given resource or principal who is the subject of the attestation 301. The attestation 301 is implemented in a machine accessible and readable medium and is used to control access to external machines or resources.

The attestation 301 may in some cases be in a SAML, Liberty Alliance, or XML-based format. Moreover, the attestation 301 may be signed by the attester and/or by the issuing authority, such as an identity service. In some cases, the attestation 301 may also be optionally encrypted.

According to an embodiment, the attestation 301 may also identify roles, access rights, and privileges associated with specific policies or sets of policies. Policies may also be identified by identifiers that can be subsequently acquired from policy stores. In fact, any format may be used with the attestation 301, so long as a specific policy is identified that is to be applied against a given resource.

The attestation 301 may be generated by an attester and the attester may be the monitoring service 302, an identity service, or another principal or resource not associated with the resource being monitored and authorized to make attestations against an identity associated with the resource being monitored. The attestation 301, as discussed above and below, is generated in response to conditions detected within the environment being monitored. Global policy may dictate the conditions or combination of conditions that warrant production of an attestation 301 and the contents of the attestation 301.

The monitoring service 302 is to dynamically monitor actions taken against a resource within an environment. In some cases, the resource may be a principal acting within the environment. The principal's assumed identity may be all that the monitoring service 302 knows about the principal. That is, the monitoring service 302 may be working with a crafted identity associated with the principal, such that the true identity of the principal is unknown to the monitoring service 302. The actions being monitored may include those that are directly associated with the principal and/or some actions that are associated with other principals or resources operating within an environment being monitored by monitor service 302.

The actions may also be monitored from the perspective of actions being taken against a particular resource; rather than from the perspective of actions being taken by a principal against the resource. So actions and raised attestations can be with respect to acting principals or with respect to passive resources being acted upon by principals within the environment.

The monitoring service 302 may then report the actions or conditions to subscribing principals or to an identity service for handling. Alternatively, the monitoring service may use global policy limitations associated with the resource, roles of the resource, and/or resources to determine when the actions or conditions warrant generation of the attestation 301. So, the attestation 301 may be supplied by another principal or by an identity service in response to notifications about the actions or conditions; or the attestation 301 may be generated by the monitoring service 302 in response to global policy limitations.

Once the attestation 301 is supplied or generated by the monitoring service 302, the monitoring service 302 applies the attestation against the resource, a principal, or an assumed operating identity of the principal to enforce a policy restriction. The policy restriction circumscribes access to the resource or circumscribes the principal's access to the resource within the environment. In some cases, the resource may be an identity service that is accessible within the environment to the principal and the policy restriction may be one that prohibits the principal from assuming a new crafted identity, role for a given identity, etc. In other cases, the policy restriction may be related to obtaining access to a particular resource or to performing some operation with a resource in which access is already permitted.

According to an embodiment, the monitoring service 302 may remove the policy restriction in response to a satisfied condition. So, the policy restriction may expire after a time-to-live attribute is satisfied or after some other condition or event is satisfied. The policy restriction may be temporary or short lived and reversible.

Example processing associated with the monitoring service 302 is provided above with respect to the method 100 of the FIG. 1 and the method 200 of the FIG. 2.

Figure 4:
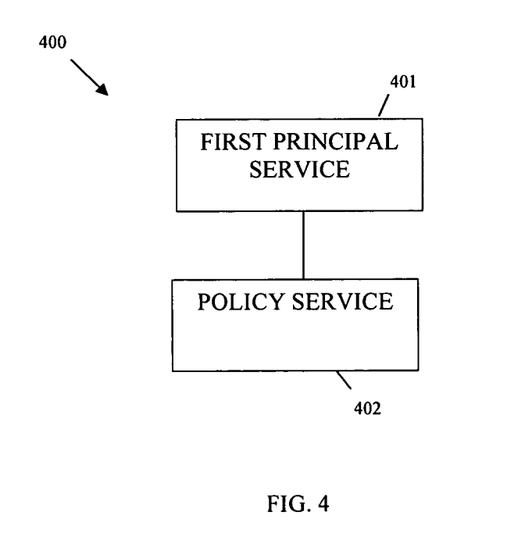
FIG. 4 is a diagram of another policy enforcement attestation system, according to an example embodiment.

FIG. 4 is a diagram of another policy enforcement attestation system 400, according to an example embodiment. The policy enforcement attestation system 400 is implemented in a machine-accessible and readable medium and is accessible over a network (wired, wireless, or a combination of wired and wireless). In an embodiment, the policy enforcement attestation system 400 implements among other things the policy-based attestation service represented by the method 100 of the FIG. 1 and the policy enforcement service represented by the method 200 of the FIG. 2. The policy enforcement attestation system 400 presents an alternative architectural arrangement to that which was depicted with the policy enforcement attestation system 300 depicted with reference to the FIG. 3.

The policy enforcement attestation system 400 includes a first principal service 401 and a policy service 402. Each of these and their interactions with one another will now be discussed in turn.

The first principal service 401 is a resource that is interested in the actions and conditions of an environment and of resources within that environment where a second principal operates. In an embodiment, the first principal service 401 may be an enhanced version of an identity service that is enhanced to provide the features described herein.

The first principal service 401 dynamically issues attestations in response to the actions and conditions of the environment within which the second principal operates. In some cases, the attestation is issued in response to detected roles that the second principal activates within the environment. In more situations, the attestation is issued in response to detected actions taken by the second principal while operating under a particular role. In still other circumstances, the attestation is issued in response to actions, conditions or events, which are independent of the second principal. It may also be the case that various combinations of the items discussed above are used by the first principal service 401 to generate and issue the attestation.

The policy service 402 is to handle the attestations issued by the first principal service 401. The attestation is validated to ensure that a first principal associated with the first principal service 401 is authorized to supply the attestation. The policy service 402 also supplies one or more policy or policy restrictions in response to the attestation. The policies are then enforced by the policy service 402 or by another service, such as an identity service, that cooperates and is in communication with the policy service 402.

Enforcement of the policies results in access restrictions being dynamically enforced against the second principal within the context of the environment. These access restrictions may be with respect to gaining access to a given resource, gaining access to a given feature or operation of a given resource, or even with respect to the second principal's ability to create or assume different identities or different roles for a given identity assumed.

The policy service 302 may also dynamically remove the access restrictions or policies being enforced. For example, the policy service 302 may dynamically stop enforcing the policy and permit normal policy and access permissions to prevail when a time-to-live attribute is satisfied for the policy or when the first principal service 301 instructs the policy service 302 to stop enforcing the policy.

The first principal service 401 may uses a monitoring service, such as the monitoring service 302 described above with respect to the system 300 for purposes of identifying the conditions, actions, and/or events that warrant raising the attestation. Alternatively, the policy service 402 may include the monitoring and notification services that interact with the first principal service 401. In still other cases, the first principal service 401 may itself operate within the environment and provide the monitoring and notification services to itself and correspondingly to the first principal associated with the first principal service 401.

It is also noted that the policy service 402 may also dynamically obtain and issue additional and different attestations that raise policy, which alters the access permissions or permissible roles associated with a given resource within the environment. So, policy may be generated and enforced from attestations in response to actions of principals or in response to conditions or actions within the environment to alter access and permissible roles for accessing a given resource. The attestations may be for the acting principals or for resources being passively acted upon within the environment.

It is now appreciated how access rights and permissions established for a given principal, who is assuming a given identity within an environment, may be dynamically modified via a dynamically applied attestation. The attestation is associated with policy and the policy is dynamically enforced to provide a more fine-grain access within the environment to resources accessible within the environment. The policy may be enforced temporarily until a condition is satisfied. Moreover, the attestation may be generated in response to various role activations, actions, events or any other condition or combination of conditions, which according to global policy dictate raising and applying the attestation. These techniques provide for a flexible response to security in dynamic and often chaotic environments.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method comprising:

configuring a security enforcement service with a policy-based attestation service on a computer network architecture at least in part by:

authenticating, by a computer system, a true identity of a principal;

creating, by the computer system in response to authenticating the true identity of the principal, a first data structure representing a crafted identity for the principal, the crafted identity concealing the true identity of the principal and comprising one or more identifiers and secrets that provide a statement specifying one or more roles and one or more permissions that the principal has in relation to one or more resources but which permits the principal's true identity to remain anonymous to the one or more resources;

detecting, by the computer system, the crafted identity of a session of interaction of the principal within an environment, and enforcing global policy limitations to recognize or trap a condition within the environment that corresponds to a current operation of the principal during the session of interaction of the principal, where the current operation corresponds to a definition of a previously defined activity;

in response to the recognizing or trapping the condition, acquiring, by the computer system, at least one attestation for the principal from at least one attesting resource at least in part by:

generating a notification comprising condition information specifying one or more characteristics of the condition occurring within the environment;

sending the notification to at least one attesting resource, the at least one attesting resource being a particular resource that has permission and authority to generate and transfer the at least one attestation, the at least one attesting resource generating the at least one attestation for the principal based on the crafted identity in response to the condition, the at least one attestation corresponding to a second data structure created to include:

a policy for altering access permissions of the principal during the session of interaction of the principal within the environment, the access permissions allowing access to resources based on a role of the principal, a statement including an indication as to the at least one attesting resource that is attesting for the principal and under what authority the at least one attestation is being made, and a signature of the at least one attesting resource that is attesting for the principal; and enforcing, by the computer system, the policy included in the at least one attestation against the principal within the environment at least in part by:

altering the one or more permissions of the principal specified by the statement in relation to the one or more resources to create one or more altered permissions during the session of interaction of the principal within the environment; and restricting resource access of the principal in accordance with the one or more altered permissions for at least part of the session of interaction of the principal within the environment.

2. The method of claim 1, further comprising:

obtaining, by the computer system, at least one other attestation in response to detecting that the condition associated with an identified resource within the environment; and enforcing, by the computer system, another policy included in the at least one other attestation against the identified resource within the environment.

3. The method of claim 1, wherein each role of the one or more roles includes one or more rights, one or more policies, and/or one or more access permissions for one or more resources accessible from the environment.

4. The method of claim 1, further comprising determining as the condition that at least one role of the one or more roles is activated by the principal operating within the environment.

5. The method of claim 1, further comprising determining as the condition that predefined roles, activities, or events occur within a predefined period of time.

6. The method of claim 1, further comprising one or more of the following:

removing, by the computer system, the policy in response to a time-to-live attribute associated with the policy expiring;

removing, by the computer system, the policy in response to an event;

removing, by the computer system, the policy in response to another different policy disposition; and/or removing, by the computer system, the policy in response to a revocation of the policy by an attester that initially supplied the attestation.

7. The method of claim 1, wherein the enforcing further includes enforcing the policy for a defined period of time.

8. A system comprising:

a processor; and a memory coupled with and readable by the processor and storing therein a set of instructions which, when executed by the processor, causes the processor to perform:

configuring a security enforcement service with a policy-based attestation service on a computer network architecture at least in part by:

authenticating a true identity of a principal;

creating, in response to authenticating the true identity of the principal, a first data structure representing a crafted identity for the principal, the crafted identity concealing the true identity of the principal and comprising one or more identifiers and secrets that provide a statement specifying one or more roles and one or more permissions that the principal has in relation to one or more resources but which permits the principal's true identity to remain anonymous to the one or more resources;

detecting the crafted identity of a session of interaction of the principal within an environment, and enforcing global policy limitations to recognize or trap a condition within the environment that corresponds to a current operation of the principal during the session of interaction of the principal, where the current operation corresponds to a definition of a previously defined activity;

in response to the recognizing or trapping the condition, acquiring at least one attestation for the principal from at least one attesting resource at least in part by:

generating a notification comprising condition information specifying one or more characteristics of the condition occurring within the environment;

sending the notification to at least one attesting resource, the at least one attesting resource being a particular resource that has permission and authority to generate and transfer the at least one attestation, the at least one attesting resource generating the at least one attestation in response to the condition, the at least one attestation corresponding to a second data structure created to include:

a policy for altering access permissions of the principal during the session of interaction of the principal within the environment, the access permissions allowing access to resources based on a role of the principal, a statement including an indication as to the at least one attesting resource that is attesting for the principal and under what authority the at least one attestation is being made, and a signature of the at least one attesting resource that is attesting for the principal; and enforcing the policy included in the at least one attestation against the principal within the environment at least in part by:

altering the one or more permissions of the principal specified by the statement in relation to the one or more resources to create one or more altered permissions during the session of interaction of the principal within the environment; and restricting resource access of the principal in accordance with the one or more altered permissions for at least part of the session of interaction of the principal within the environment.

9. The system of claim 8, the processor to further provide security enforcement by:

obtaining at least one other attestation in response to detecting that the condition associated with an identified resource within the environment; and enforcing another policy in response to the at least one other attestation against the identified resource within the environment.

10. The system of claim 8, wherein each role of the one or more roles includes one or more rights, one or more policies, and/or one or more access permissions for one or more resources accessible from the environment.

11. The system of claim 8, the processor to further provide security enforcement by determining as the condition that at least one role of the one or more roles is activated by the principal operating within the environment.

12. The system of claim 8, the processor to further provide security enforcement by determining as the condition that predefined roles, activities, or events occur within a predefined period of time.

13. The system of claim 8, the processor to further provide security enforcement by one or more of the following:

removing the policy in response to a time-to-live attribute associated with the policy expiring;

removing the policy in response to an event;

removing the policy in response to another different policy disposition; and/or removing the policy in response to a revocation of the policy by an attester that initially supplied the attestation.

14. The system of claim 8, wherein the enforcing further includes enforcing the policy for a defined period of time.

15. A non-transitory, computer-readable memory comprising a set of instructions stored therein which, when executed by a processor, causes the processor to perform:

configuring a security enforcement service with a policy-based attestation service on a computer network architecture at least in part by:

authenticating a true identity of a principal;

creating, in response to authenticating the true identity of the principal, a first data structure representing a crafted identity for the principal, the crafted identity concealing the true identity of the principal and comprising one or more identifiers and secrets that provide a statement specifying one or more roles and one or more permissions that the principal has in relation to one or more resources but which permits the principal's true identity to remain anonymous to the one or more resources;

detecting the crafted identity of a session of interaction of the principal within an environment, and enforcing global policy limitations to recognize or trap a condition within the environment that corresponds to a current operation of the principal during the session of interaction of the principal, where the current operation corresponds to a definition of a previously defined activity;

in response to the recognizing or trapping the condition, acquiring at least one attestation for the principal from at least one attesting resource at least in part by:

generating a notification comprising condition information specifying one or more characteristics of the condition occurring within the environment;

sending the notification to at least one attesting resource, the at least one attesting resource being a particular resource that has permission and authority to generate and transfer the at least one attestation, the at least one attesting resource generating the at least one attestation in response to the condition, the at least one attestation corresponding to a second data structure created to include:

a policy for altering access permissions of the principal during the session of interaction of the principal within the environment, the access permissions allowing access to resources based on a role of the principal, a statement including an indication as to the at least one attesting resource that is attesting for the principal and under what authority the at least one attestation is being made, and a signature of the at least one attesting resource that is attesting for the principal; and enforcing the policy included in the at least one attestation against the principal within the environment at least in part by:

altering the one or more permissions of the principal specified by the statement in relation to the one or more resources to create one or more altered permissions during the session of interaction of the principal within the environment; and restricting resource access of the principal in accordance with the one or more altered permissions for at least part of the session of interaction of the principal within the environment.

16. The non-transitory, computer-readable memory of claim 15, the processor to further provide security enforcement by:

obtaining at least one other attestation in response to detecting that the condition associated with an identified resource within the environment; and enforcing another policy in response to the at least one other attestation against the identified resource within the environment.

17. The non-transitory, computer-readable memory of claim 15, wherein each role of the one or more roles includes one or more rights, one or more policies, and/or one or more access permissions for one or more resources accessible from the environment.

18. The non-transitory, computer-readable memory of claim 15, the processor to further provide dynamic security enforcement by: determining as the condition that at least one role of the one or more roles is activated by the principal operating within the environment, or determining as the condition that predefined roles, activities, or events occur within a predefined period of time.

19. The non-transitory, computer-readable memory of claim 15, the processor to further provide dynamic security enforcement by one or more of the following:
   removing the policy in response to a time-to-live attribute associated with the policy expiring;
   removing the policy in response to an event;
   removing the policy in response to another different policy disposition; and/or
   removing the policy in response to a revocation of the policy by an attester that initially supplied the attestation.

20. The non-transitory, computer-readable memory of claim 15, wherein the enforcing further includes enforcing the policy for a defined period of time.

\* \* \* \* \*

UNITED STATES PATENT AND TRADEMARK OFFICE
CERTIFICATE OF CORRECTION

PATENT NO. : 10,275,723 B2
APPLICATION NO. : 11/638121
DATED : April 30, 2019
INVENTOR(S) : Buss et al.

It is certified that error appears in the above-identified patent and that said Letters Patent is hereby corrected as shown below:

In the Specification

In Column 7, Line 33, delete "loner" and insert -- longer --, therefor.

In the Claims

In Column 15, Line 7, in Claim 18, after "provide" delete "dynamic".

In Column 15, Line 14, in Claim 19, after "provide" delete "dynamic".

Signed and Sealed this
Twenty-eighth Day of July, 2020

Andrei Iancu
*Director of the United States Patent and Trademark Office*